(12) United States Patent
Chao et al.

(10) Patent No.: US 11,163,179 B2
(45) Date of Patent: Nov. 2, 2021

(54) EYEWEAR AND TEMPLE UNIT FOR EYEWEAR

(71) Applicant: CONTOUR OPTIK INC., Minxiong Township, Chiayi County (TW)

(72) Inventors: David Chao, Saratoga, CA (US); Chien-Ho Lin, Minxiong Township, Chiayi County (TW)

(73) Assignee: CONTOUR OPTIK INC., Minxiong Township (TW)

( * ) Notice: Subject to any disclaimer, the term of this patent is extended or adjusted under 35 U.S.C. 154(b) by 273 days.

(21) Appl. No.: 16/584,435

(22) Filed: Sep. 26, 2019

(65) Prior Publication Data

US 2021/0018761 A1 Jan. 21, 2021

(30) Foreign Application Priority Data

Jul. 15, 2019 (CN) .......................... 201921101009.6

(51) Int. Cl.
*G02C 5/14* (2006.01)
*G02C 5/20* (2006.01)
(52) U.S. Cl.
CPC ............... *G02C 5/143* (2013.01); *G02C 5/20* (2013.01)

(58) Field of Classification Search
CPC . G02C 5/14; G02C 5/143; G02C 5/20; G02C 3/00
USPC ................. 351/123, 122, 111, 118, 119, 121
See application file for complete search history.

(56) References Cited

U.S. PATENT DOCUMENTS

2002/0003604 A1* 1/2002 Yaguchi ................. G02C 5/143
351/122

* cited by examiner

*Primary Examiner* — Hung X Dang
(74) *Attorney, Agent, or Firm* — Hamre, Schumann, Mueller & Larson, P.C.

(57) ABSTRACT

A temple unit for an eyewear includes two temples each including pivotally connected front and rear segments. The front and rear segments respectively include adjacent rear and front ends. One of the front and rear ends is formed with a protruding portion, and the other one of the front and rear ends is formed with a recess portion. The protruding portion has at least three non-coplanar first flat surfaces defining two convex corner sections. Any two adjacent ones of the first flat surfaces are connected to each other to define one of the convex corner sections. The recess portion has at least two non-coplanar second flat surfaces connected to each other to define a concave corner section engaging a selected one of the convex corner sections so as to position the rear segment relative to the front segment.

14 Claims, 12 Drawing Sheets

EYEWEAR AND TEMPLE UNIT FOR EYEWEAR

CROSS-REFERENCE TO RELATED APPLICATION

This application claims priority of Chinese Utility Model Patent Application No. 201921101009.6, filed on Jul. 15, 2019.

FIELD

The disclosure relates to an eyewear, more particularly to an eyewear having an adjustable temple unit.

BACKGROUND

Generally, an eyewear includes a main frame and two temples mounted respectively at left and right sides of the mainframe. The temples have bent earpieces respectively disposed at rear ends thereof and to be worn on the ears of a user. However, an angle defined by each bent earpiece is usually not adjustable. As a result, when the user is exercising, for example, jogging or playing ball, the eyewear tends to fall off.

SUMMARY

Therefore, an object of the disclosure is to provide an eyewear including adjustable temples.

According to an aspect of the present disclosure, an eyewear is provided to include a main frame unit that includes two mounting portions at left and right sides thereof and a temple unit that includes two temples mounted respectively to the mounting portions. Each of the temples includes a front segment, a rear segment, and a pivot connector. The front segment has a rear end. The rear segment has a front end adjacent to the rear end of the front segment. One of the rear end and the front end is formed with a protruding portion, and the other one of the rear end and the front end is formed with a recess portion. The protruding portion has at least three first flat surfaces that are non-coplanar and that define two convex corner sections. Any two adjacent ones of the first flat surfaces are connected to each other and form a first obtuse angle therebetween to define one of the convex corner sections. The recess portion has at least two second flat surfaces that are non-coplanar, that are connected to each other to define a concave corner section engaging a selected one of the convex corner sections so as to position the rear segment relative to the front segment, and that form a second obtuse angle therebetween. The pivot connector connects the front end pivotally to the rear end so as to allow the rear segment to pivot relative to the front segment. The rear segment is prevented from pivoting movement relative to the front segment when the concave corner section engages the selected one of the convex corner sections.

According to another aspect of the disclosure, a temple unit for an eyewear includes two temples adapted to be mounted respectively at left and right sides of the eyewear. Each of the temples includes a front segment, a rear segment, and a pivot connector. The front segment has a rear end. The rear segment has a front end adjacent to the rear end 211 of the front segment. One of the rear end and the front end is formed with a protruding portion, and the other one of the rear end and the front end is formed with a recess portion. The protruding portion has at least three first flat surfaces that are non-coplanar and that define two convex corner sections. Any two adjacent ones of the first flat surfaces are connected to each other and form a first obtuse angle therebetween to define one of the convex corner sections. The recess portion has at least two second flat surfaces that are non-coplanar, that are connected to each other to define a concave corner section engaging a selected one of the convex corner sections so as to position the rear segment relative to the front segment, and that form a second obtuse angle therebetween. The pivot connector connects the front end pivotally to the rear end so as to allow the rear segment to pivot relative to the front segment. The rear segment is prevented from pivoting movement relative to the front segment when the concave corner section engages the selected one of the convex corner sections.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail with reference to the accompanying embodiments, it should be noted herein that like elements are denoted by the same reference numerals throughout the disclosure.

Figure 1:
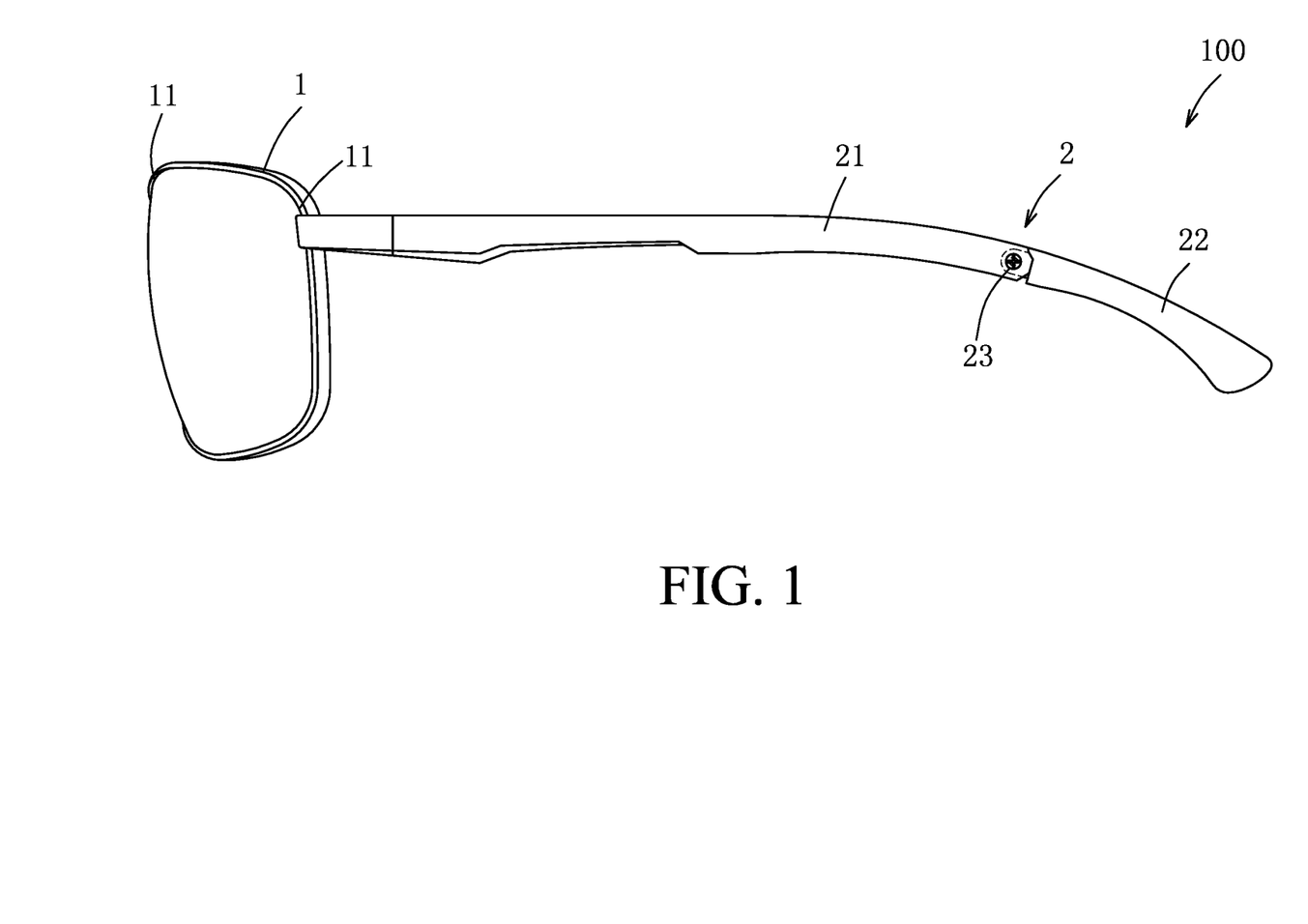
FIG. 1 is a schematic side view of an eyewear according to a first embodiment of the present disclosure.
Figure 2:
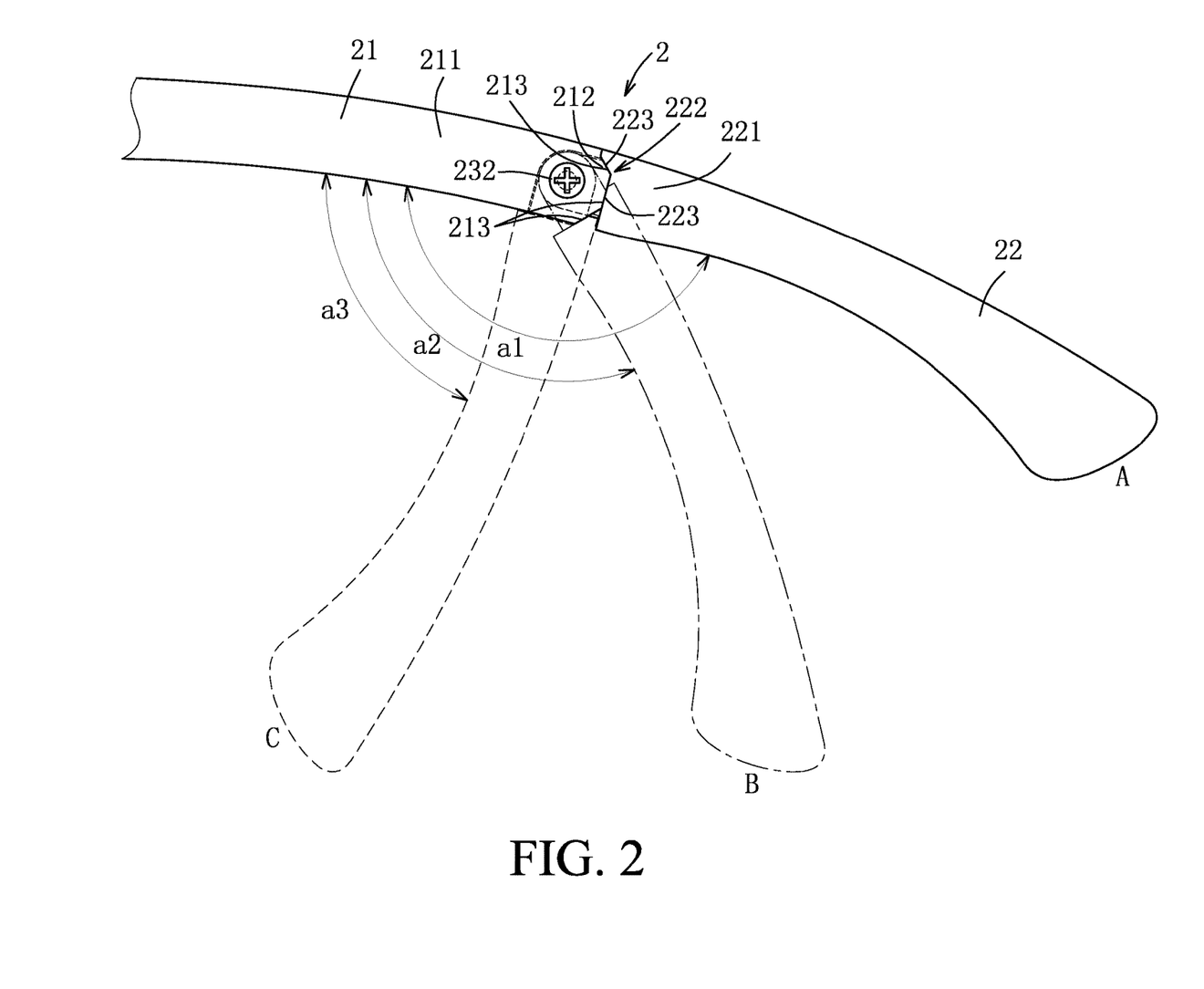
FIG. 2 is a fragmentary side view of a temple of the eyewear of the first embodiment, illustrating the temple including a front segment and a rear segment being pivotable to the front segment among three positions.
Figure 3:
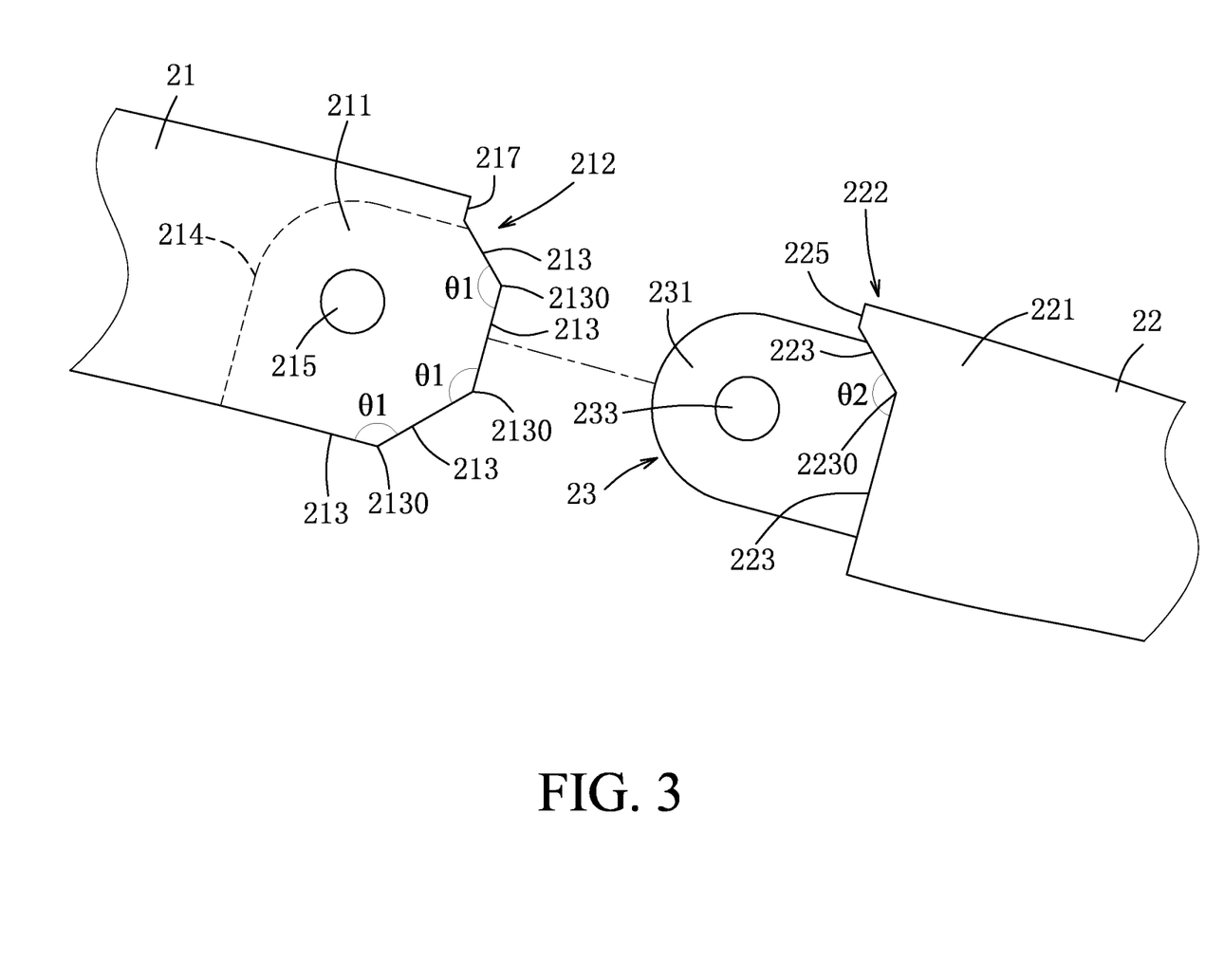
FIG. 3 is a fragmentary enlarged side view of the front segment and the rear segment, illustrating detailed structure of the front and rear segments.

Referring to FIGS. 1 to 3, an eyewear 100 according to a first embodiment of the present disclosure is shown. The eyewear 100 includes a main frame unit 1 including two mounting portions 11 at left and right sides thereof, and a temple unit including two temples 2 (only one is shown) mounted respectively to the mounting portions 11. Note that since the structures of the temples 2 are identical, only one of the temples 2 will be described in the following descriptions.

Each of the temples 2 includes a front segment 21, a rear segment 22 and a pivot connector 23. The front segment 21 has a rear end 211. The rear segment 22 has a front end 221 adjacent to and corresponding in position to the rear end 211 of the front segment 21. One of the rear end 211 and the front end 221 is formed with a protruding portion 212, the other one of the rear end 211 and the front end 221 is formed with a recess portion 222. In this embodiment, the protruding portion 212 is formed in the rear end 211 of the front segment 21 and the recess portion 222 is formed in the front end 221 of the rear segment 21 but the present disclosure is not limited to the disclosure herein.

The protruding portion 212 has four first flat surfaces 213 that are non-coplanar and that define three convex corner sections 2130. Specifically, any two adjacent ones of the first flat surfaces 213 are connected to each other and form a first obtuse angle θ1 therebetween to define one of the convex corner sections 2130. The recess portion 222 has two second flat surfaces 223 that are non-coplanar, that are connected to each other to define a concave corner section 2230 and that form a second obtuse angle θ2 therebetween. Each of the convex corner sections 2130 has a profile substantially complementary to that of the concave corner section 2230. The concave corner section 2230 can be brought to engage a selected one of the convex corner sections 2130. Note that the first obtuse angle θ1 is substantially equal to the second obtuse angle θ2 but the present disclosure is not limited to the example herein. For example, in other embodiments, the first obtuse angle θ1 and the second obtuse angle θ2 may be slightly different from each other as long as each convex corner section 2130 is capable of engaging the concave corner section 2230. It should be noted that the numbers of the first flat surfaces 213 and the second flat surfaces 223 are not limited to the example described herein and can be modified according to other design requirements.

The pivot connector 23 connects the front end 221 pivotally to the rear end 211 so as to allow the rear segment 22 to pivot relative to the front segment 21. The rear segment 22 is prevented from pivoting movement relative to the front segment 21 when the concave corner section 2230 engages a selected one of the convex corner sections 2130. Specifically, as shown in FIG. 3, the rear end 211 of the front segment 21 is formed with a groove 214 indented from a lower end of the rear end 211, and a first through hole 215 extending through the rear end 211 in a left-right direction along which the temples 2 are spaced apart and in spatial communication with the groove 214.

The pivot connector 23 includes a tongue 231 and a fastening member 232 (see FIG. 2). The tongue 231 has one end that is connected fixedly to the front end 221 and the other end extending into the groove 214 and is formed with a second through hole 233 aligned with the first through hole 215 in the left-right direction. The fastening member 232 extends into the first through hole 215 and the second through hole 233 to connect the rear end 211 of the front segment 21 to the end of the tongue 231 extending into the groove 214, in such a manner that the rear segment 22 is pivotable relative to the front segment 21 about the fastening member 232. In this embodiment, the tongue 231 is made of metal, the fastening member 232 is a screw, and the first through hole 215 and the second through hole 233 are threaded.

As shown in FIGS. 2 and 3, the second flat surfaces 223 abut against the upper two adjacent ones of the first flat surfaces 213 so as to allow the concave corner section 2230 defined by the second flat surfaces 223 to engage an uppermost one of the convex corner sections 2130 and thus the rear segment 22 is positioned relative to the front segment 21 at a position (A) illustrated by solid lines in FIG. 2, where the front and rear segments 21, 22 define a first included angle (a1) therebetween and extend substantially in the same direction. To adjust an included angle defined by the front and rear segments 21, 22, the rear segment 22 is brought to pivot downwardly relative to the front segment 21 to a position (B) illustrated by phantom lines in FIG. 2, where the front and rear segments 21, 22 define a second included angle (a2) therebetween, and the concave corner section 2230 engages the middle one of the convex corner sections 2130. The rear segment 22 can be further pivoted relative to the front segment 21 to a position (C) illustrated by dotted lines in FIG. 2, where the concave corner section 2230 engages a lowermost one of the convex corner sections 2130 and the front and rear segments 21, 22 define a third included angle (a3) therebetween. In this embodiment, the first angle (a1) is greater than the second angle (a2) and the second angle (a2) is greater than the third angle (a3).

It should be noted that, the protruding portion 212 further has a rearward facing limiting surface 217 disposed above and non-coplanar with the uppermost one of the first flat surfaces 213, and the recess portion 222 further has a forward facing limiting surface 225 disposed above and non-coplanar with the uppermost one of the second flat surfaces 223, and abutting against the rearward facing limiting surface 217 to prevent the rear segment 22 from pivot upwardly relative to the front segment 21 when the rear segment 22 is at the position (A).

Figure 4:
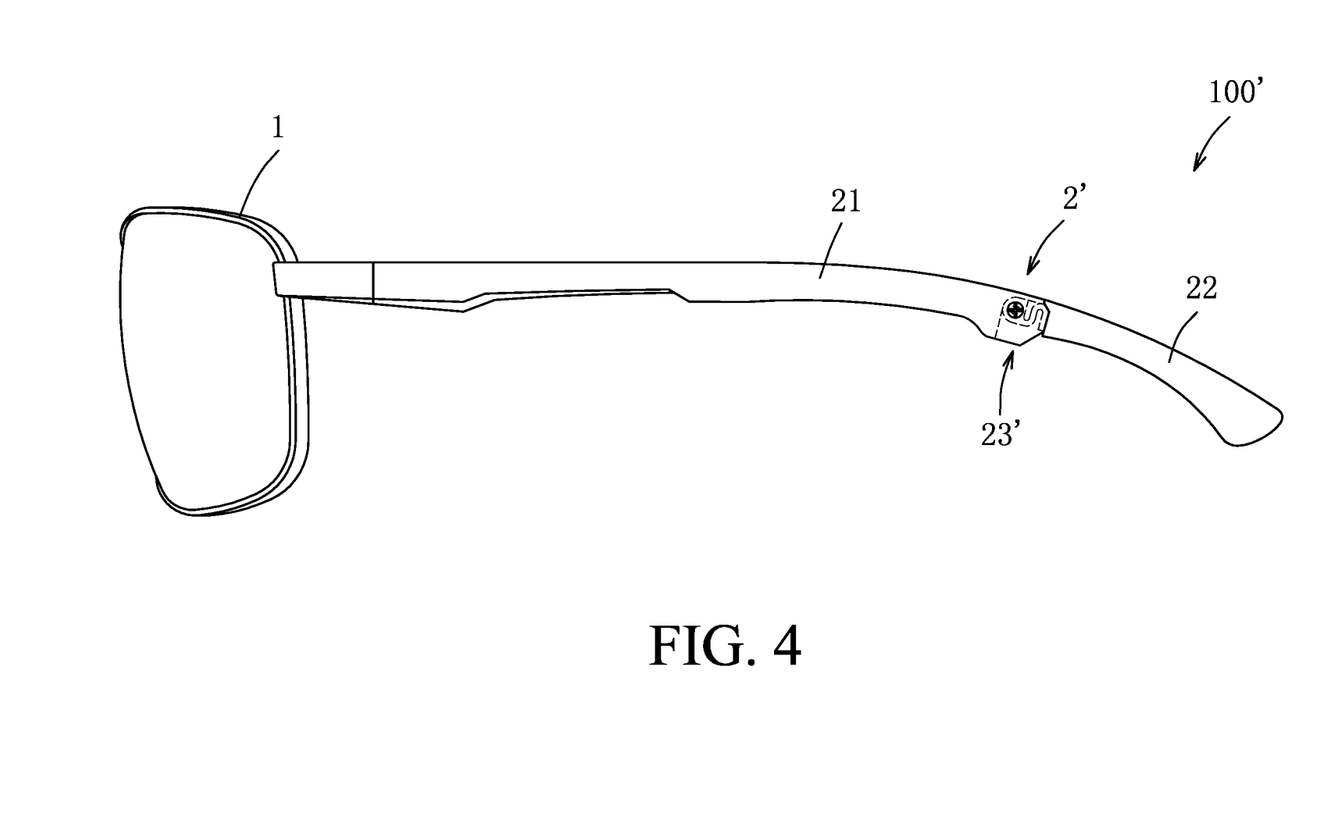
FIG. 4 is a schematic side view of an eyewear according to a second embodiment of the present disclosure.
Figure 5:
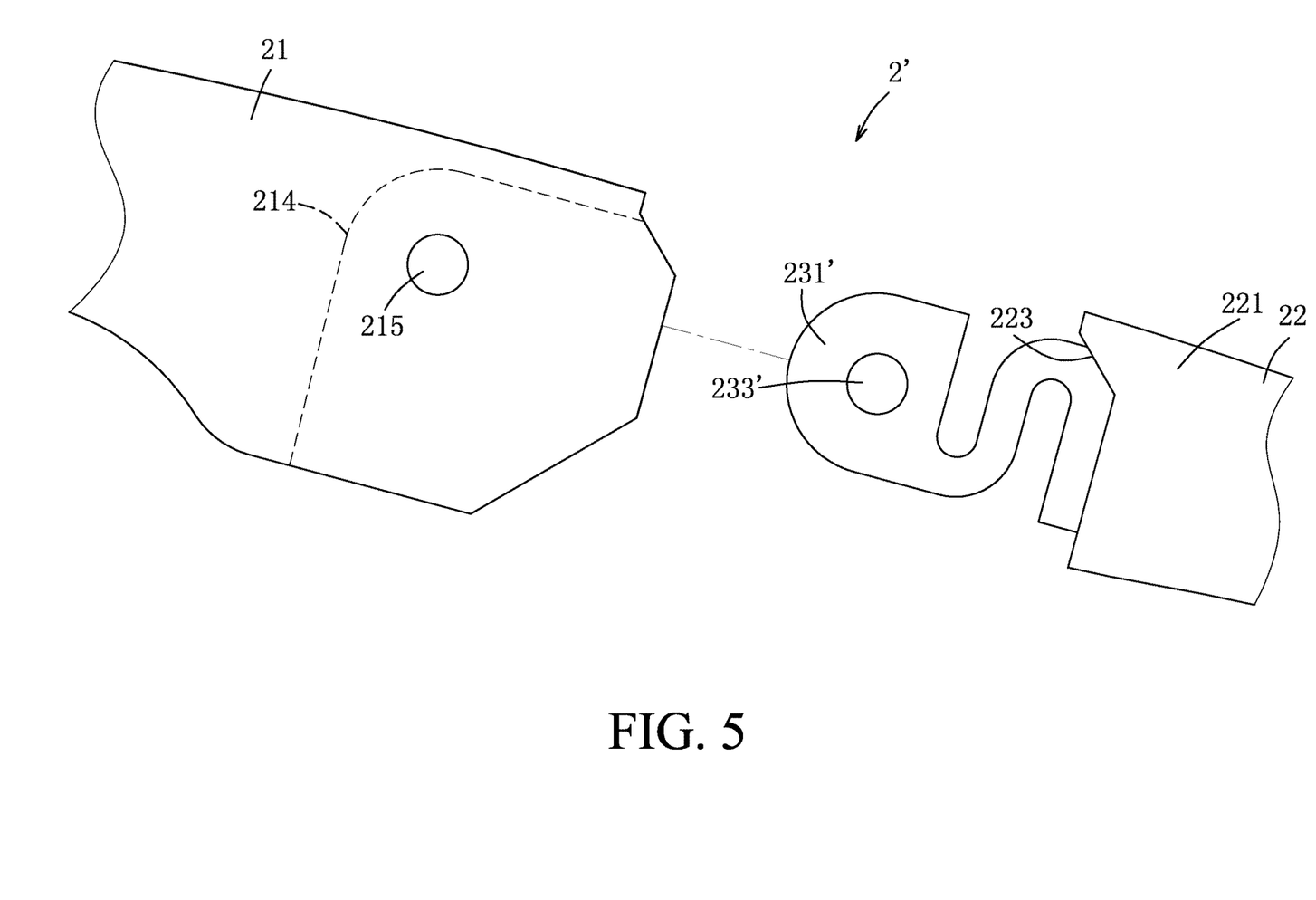
FIG. 5 is a fragmentary enlarged side view of the front segment and the rear segment of the eyewear of the second embodiment separated from each other.
Figure 6:
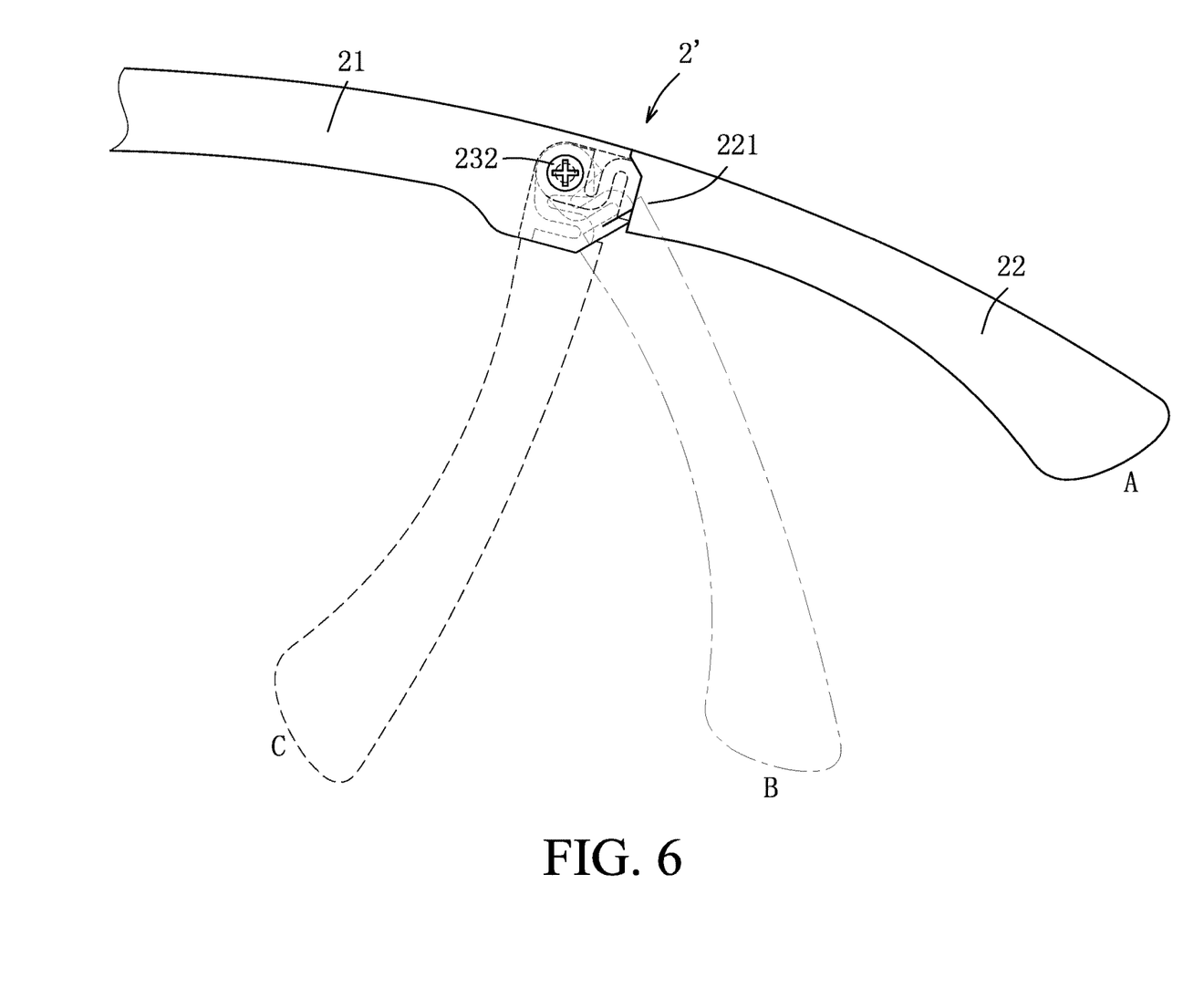
FIG. 6 is a fragmentary side view of a temple of the eyewear of the second embodiment, illustrating the rear segment being pivotable to the front segment among three positions.

Referring to FIGS. 4 to 6, an eyewear 100' according to a second embodiment of the present disclosure is shown to include a main frame unit 1 and a temple unit including two temples 2' (only one is shown). The second embodiment is similar to the first embodiment and the difference between the second embodiment and the first embodiment resides in the structure of the temples 2'. Note that since the structures of the temples 2' are identical, only one of the temples 2' will be described in the following descriptions. Specifically, each temple 2' includes a pivot connector 23' including a tongue 231' configured to have an s-shape extending in a front-rear direction transverse to the left-right direction. The tongue 231' has one end that is connected fixedly to the front end 221, for example, by a pin (not shown), and the other end extending into the groove 214 and is formed with a second through hole 233' aligned with the first through hole 215 in the left-right direction so as to be connected to the front segment 21 by the fastening member 232 (see FIG. 6) in such a manner that the rear segment 22 is pivotable relative to the front segment 21 about the fastening member 232. In this way, the eyewear 100' of the second embodiment can be adjusted among three positions (A, B, C) in a manner the same as those described in the first embodiment.

Figure 7:
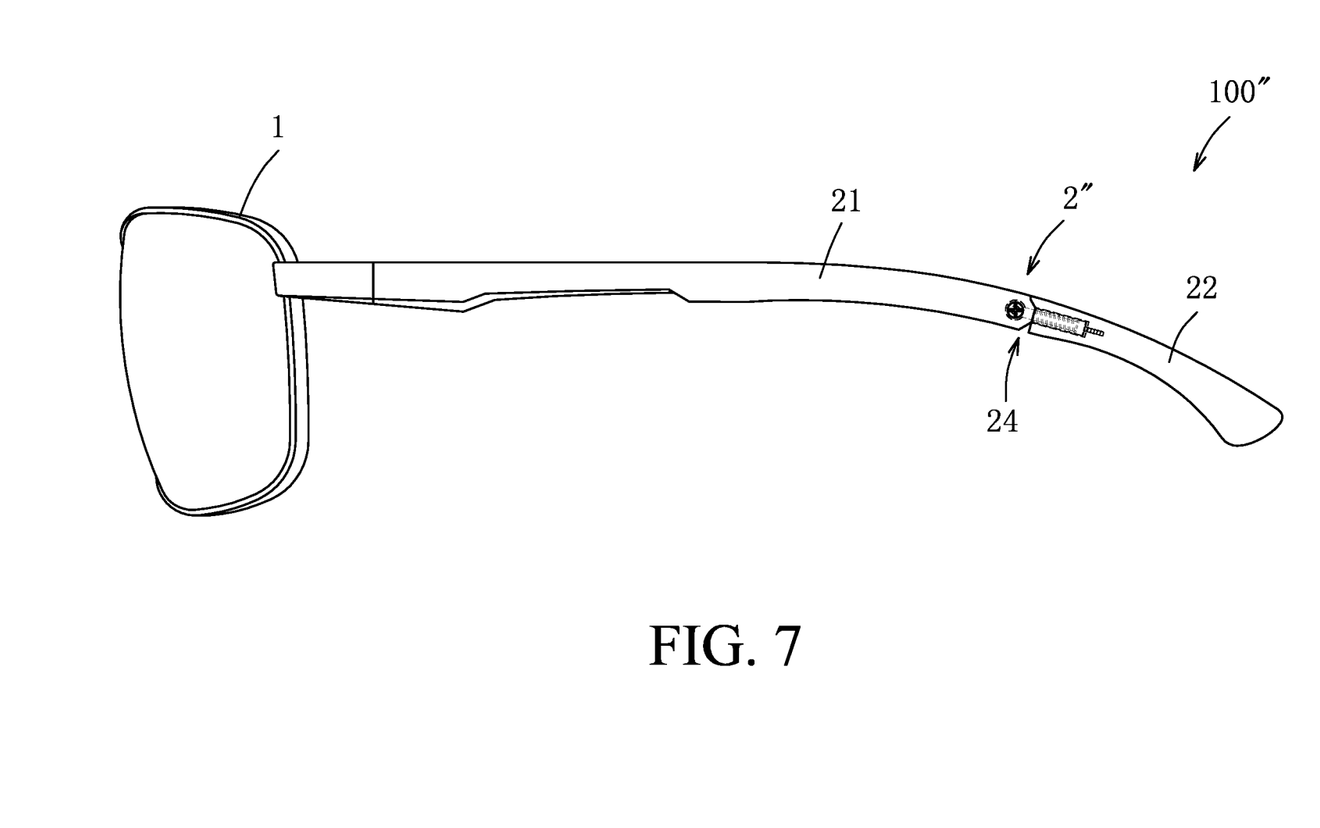
FIG. 7 is a schematic side view of an eyewear according to a third embodiment of the present disclosure.
Figure 8:
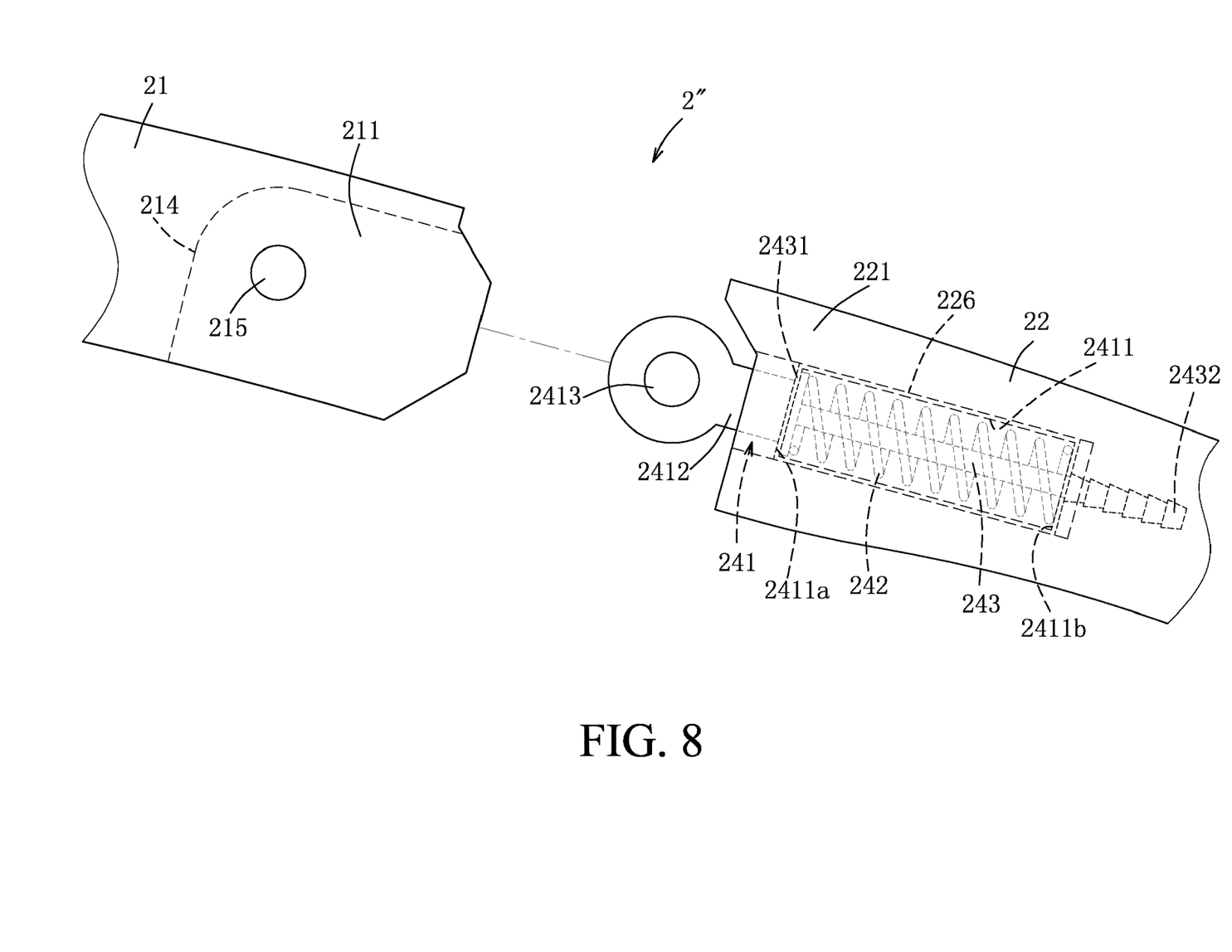
FIG. 8 is a fragmentary enlarged side view of a temple of the third embodiment, illustrating detailed structure of the front and rear segments.
Figure 9:
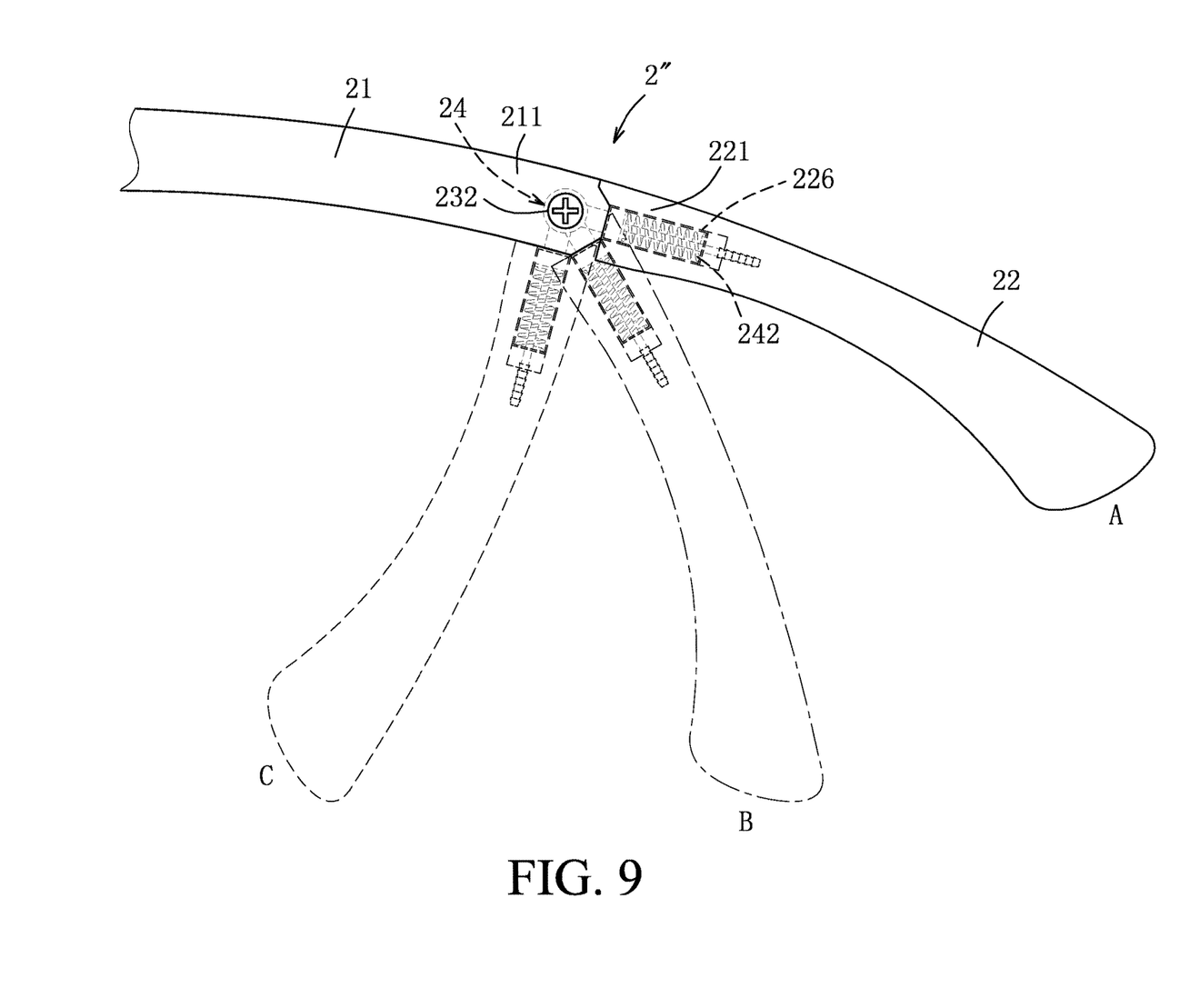
FIG. 9 is a fragmentary side view of the temple of the eyewear of the third embodiment, illustrating the rear segment being pivotable to the front segment among three positions.

Referring to FIGS. 7 to 9, an eyewear 100" according to a third embodiment of the present disclosure is shown to include a main frame unit 1 and a temple unit including two temples 2" (only one is shown). The third embodiment is similar to the first embodiment and the difference between the first and second embodiments resides in the structure of each temple 2". Note that since the structures of the temples 2″ are identical, only one of the temples 2″ will be described in the following descriptions. In this embodiment, the rear end 211 of the front segment 21 of the temple 2″ is still formed with the groove 214 (hereinafter referred to as first groove) indented from a lower end of the rear end 211, and the front end 221 of the rear segment 22 is formed with a second groove 226 open toward the rear end 211 of the front segment 21. The temple 2″ includes a pivot connector 24 including a movable member 241, a biasing member 242, a rod 243 and a fastening member 232 (see FIG. 9). The movable member 241 includes an elongated housing 2411 and a pivot connecting segment 2412. The elongated housing 2411 is disposed movably in the second groove 226 and has front and rear end walls 2411a, 2411b. The pivot connecting segment 2412 extends from the elongated housing 2411 outwardly of the second groove 226 into the first groove 214, is formed with a second through hole 2413 aligned with the first through hole 215 in the left-right direction. The rod 243 extends movably through the rear end wall 2411b of the elongated housing 2411, and has a fixed portion 2432 that extends outwardly of the elongated housing 2411 away from the front end 221 and that is fixed in the second groove 226 and a head portion 2431 that is disposed in the elongated housing 2411 and that has a diameter greater than that of the biasing member 242. The biasing member 242 is disposed in the elongated housing 2411, is sleeved on the rod 243, has opposite ends that respectively abut against the head portion 2431 and the rear end wall 2411b of the elongated housing 2411, and biases the movable member 241 toward the fixed portion 2432. The fastening member 232 of the pivot connector 24 extends through the second through hole 2413 and the first through hole 215 in the left-right direction so as to connect the pivot connecting segment 2412 to the rear end 211 of the front segment 21 in such a manner that the rear segment 22 is pivotable relative to the front segment 21 about the fastening member 232. In this way, the eyewear 100″ of the third embodiment can be adjusted among three positions (A, B, C) in a manner the same as those described in the first embodiment.

Figure 10:
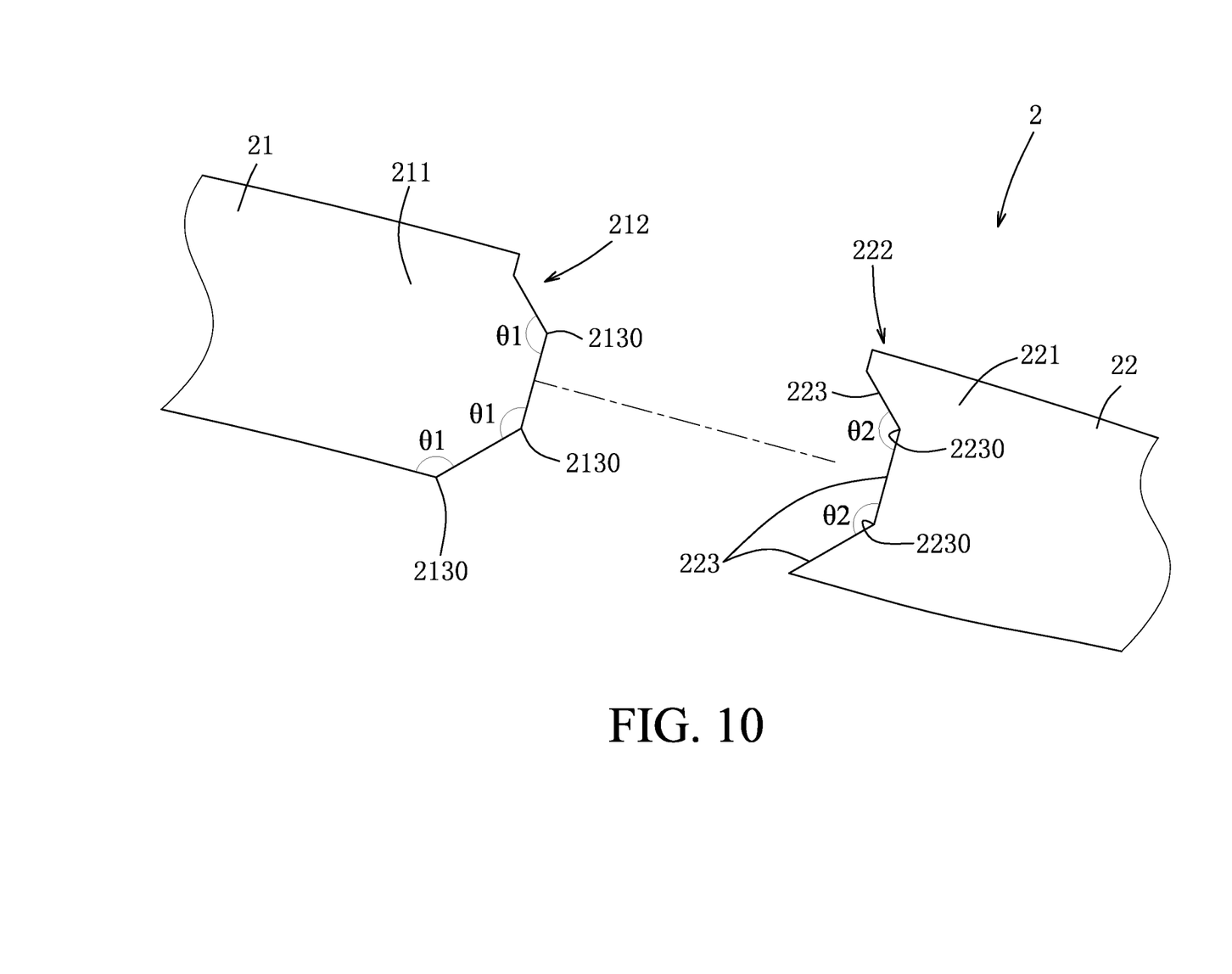
FIG. 10 is a schematic fragmentary enlarged side view of a modified temple of an eyewear of the present disclosure, illustrating a front end of the rear segment having a different structure.
Figure 11:
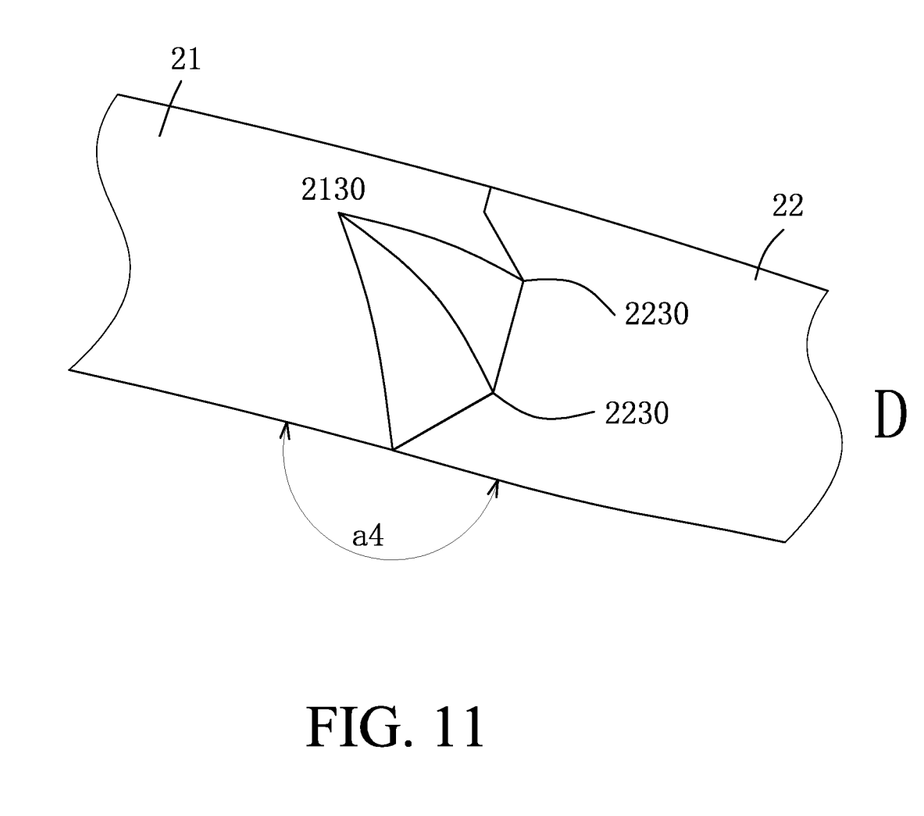
FIG. 11 is a fragmentary enlarged side view of the temple of FIG. 10.
Figure 12:
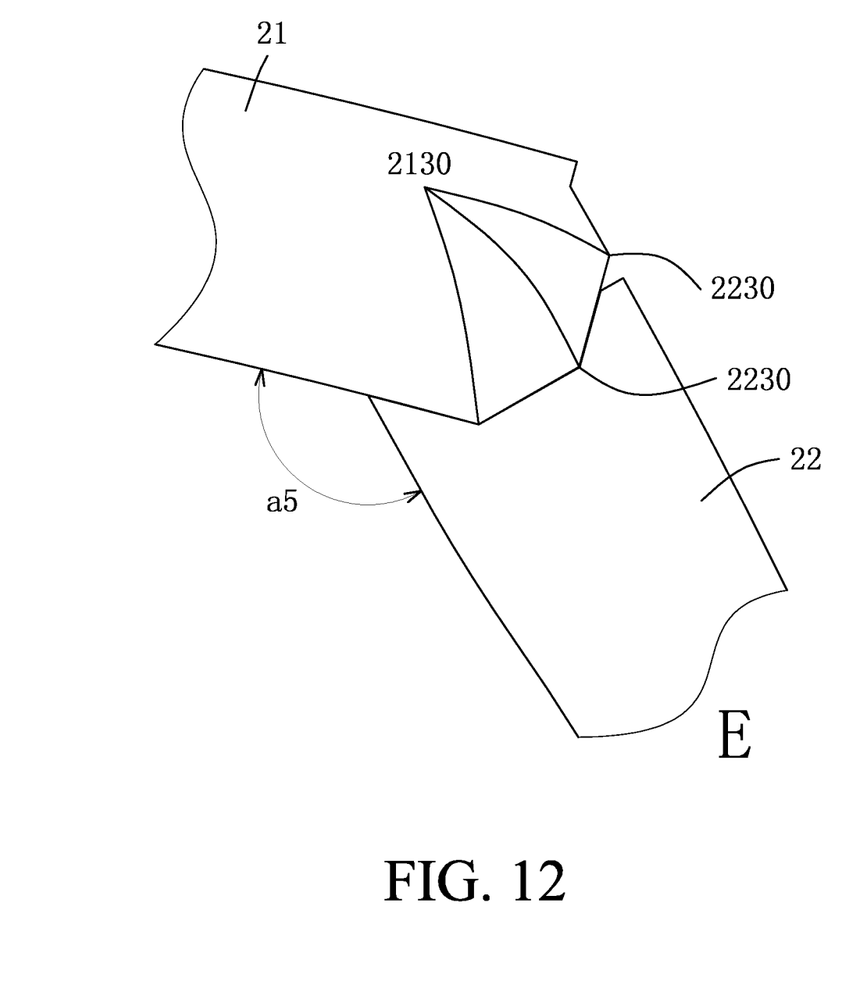
FIG. 12 is a fragmentary enlarged side view similar to FIG. 11, but illustrating the rear segment pivoted downwardly relative to the front segment.

Referring to FIGS. 10 to 12, a modification of the temple 2 is shown. Note that since the modification to the temple 2 is applicable to the eyewear 100, 100′, 100″ according to the first to the third embodiments, the pivot connectors 23, 23′, 24 of the first to the third embodiments are not shown in FIGS. 10 to 12 for the sake of clarity. In the modification, the recess portion 222 has three of the second flat surfaces 223 that are non-coplanar and that define two concave corner sections 2230. Any two adjacent ones of the second flat surfaces 223 are connected to each other and form the second obtuse angle θ2 therebetween to define one of the concave corner sections 2230. The rear segment 22 is positioned relative to the front segment 21 when the concave corner sections 2230 are brought into engagement with any two adjacent ones of the convex corner sections 2130, respectively. Specifically, as shown in FIG. 11, the rear segment 22 is positioned relative to the front segment 21 at a position (D) where the front and rear segments 21, 22 define a fourth included angle (a4) therebetween. Now referring to FIG. 12, when the concave corner sections 2230 are brought into engagement with the other two adjacent ones of the convex corner sections 2130, respectively, the rear segment 22 is positioned relative to the front segment 21 at a position (E) where the front and rear segments 21, 22 define a fifth included angle (a5) therebetween.

To sum up, by virtue of the configurations of the protruding portion 212 and the recess portion 222 respectively formed in the front segment 21 and the rear segment 22, the rear segment 22 is prevented from pivoting movement relative to the front segment 21 when the concave corner section 2230 defined by the recess portion 222 engages any one of the convex corner sections 2130 defined by the protruding portion 212. In this way, the included angle defined between the front and rear segments 21, 22 can be simply adjusted by pivoting the rear segment 22 relative to the front segment 21 to various positions (A, B, C, D, E), thereby providing an eyewear including temples that are adjustable according to user demand.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A temple unit for an eyewear, comprising
two temples adapted to be mounted respectively at left and right sides of the eyewear, each of said temples including:
a front segment that has a rear end;
a rear segment that has a front end adjacent to said rear end of said front segment, one of said rear end and said front end being formed with a protruding portion, the other one of said rear end and said front end being formed with a recess portion, said protruding portion having at least three first flat surfaces that are non-coplanar and that define two convex corner sections, any two adjacent ones of said first flat surfaces being connected to each other and forming a first obtuse angle therebetween to define one of said convex corner sections, said recess portion having at least two second flat surfaces that are non-coplanar, that are connected to each other to define a concave corner section engaging a selected one of said convex corner sections so as to position said rear segment relative to said front segment, and that form a second obtuse angle therebetween; and
a pivot connector connecting said front end pivotally to said rear end so as to allow said rear segment to pivot relative to said front segment, said rear segment being prevented from pivoting movement relative to said front segment when said concave corner section engages the selected one of said convex corner sections.

2. The temple unit as claimed in claim 1, wherein, for each of said temples, said rear end of said front segment is formed with a groove indented from a lower end of said rear end, and a first through hole extending through said rear end in a left-right direction and in spatial communication with said groove, said pivot connector including a tongue and a fastening member, said tongue having one end that is connected fixedly to said front end and the other end extending into said groove and formed with a second through hole aligned with said first through hole in the left-right direction, said fastening member extending into said first through hole and said second through hole to connect said rear end to the end of said tongue extending into said groove in such a manner that said rear segment is pivotable relative to said front segment about said fastening member.

3. The temple unit as claimed in claim 2, wherein said tongue is made of metal, said fastening member being a screw, said first through hole and said second through hole being threaded.

4. The temple unit as claimed in claim 2, wherein said tongue of said pivot connector is configured to have an s-shape extending in a front-rear direction transverse to the left-right direction.

5. The temple unit as claimed in claim 1, wherein said rear end of said front segment is formed with a first groove indented from a lower end of said rear end, and a first through hole extending through said rear end in a left-right direction and in spatial communication with said first groove, said front end of said rear segment being formed with a second groove open toward said rear end of said front segment, said pivot connector including a movable member, a biasing member, a rod and a fastening member, said movable member including an elongated housing disposed movably in said second groove and having front and rear end walls, and a pivot connecting segment extending from said elongated housing outwardly of said second groove into said first groove, formed with a second through hole aligned with said first through hole in the left-right direction, said rod extending movably through said rear end wall of said elongated housing and having a head portion that is disposed in said elongated housing and that has a diameter greater than that of said biasing member, and a fixed portion that extends outwardly of said elongated housing away from said front end and that is fixed in said second groove, said biasing member being disposed in said elongated housing, sleeved on said rod, having opposite ends that respectively abut against said head portion and said rear end wall of said elongated housing, and biasing said movable member toward said fixed portion, said fastening member of said pivot connector extending through said second through hole and said first through hole in the left-right direction so as to connect said pivot connecting segment to said rear end in such a manner that said rear segment is pivotable relative to said front segment about said fastening member.

6. The temple unit as claimed in claim 1, wherein said protruding portion has four of said first flat surfaces that are non-coplanar and that define three of said convex corner sections.

7. The temple unit as claimed in claim 1, wherein said protruding portion has four of said first flat surfaces that are non-coplanar and that define three of said convex corner sections, said recess portion having three of said second flat surfaces that are non-coplanar and that define two concave corner sections, any two adjacent ones of said second flat surfaces being connected to each other and forming the second obtuse angle therebetween to define one of said concave corner sections, said rear segment being positioned relative to said front segment when said concave corner sections are brought into engagement with any two adjacent ones of said convex corner sections, respectively.

8. An eyewear comprising:
a main frame unit including two mounting portions at left and right sides thereof; and
a temple unit including two temples mounted respectively to said mounting portions, each of said temples including:
a front segment that has a rear end;
a rear segment that has a front end adjacent to said rear end of said front segment, one of said rear end and said front end being formed with a protruding portion, the other one of said rear end and said front end being formed with a recess portion, said protruding portion having at least three first flat surfaces that are non-coplanar and that define two convex corner sections, any two adjacent ones of said first flat surfaces being connected to each other and forming a first obtuse angle therebetween to define one of said convex corner sections, said recess portion having at least two second flat surfaces that are non-coplanar, that are connected to each other to define a concave corner section engaging a selected one of said convex corner sections so as to position said rear segment relative to said front segment, and that form a second obtuse angle therebetween; and
a pivot connector connecting said front end pivotally to said rear end so as to allow said rear segment to pivot relative to said front segment, said rear segment being prevented from pivoting movement relative to said front segment when said concave corner section engages the selected one of said convex corner sections.

9. The eyewear as claimed in claim 8, wherein, for each of said temples, said rear end of said front segment is formed with a groove indented from a lower end of said rear end, and a first through hole extending through said rear end in a left-right direction and in spatial communication with said groove, said pivot connector including a tongue and a fastening member, said tongue having one end that is connected fixedly to said front end and the other end extending into said groove and formed with a second through hole aligned with said first through hole in the left-right direction, said fastening member extending into said first through hole and said second through hole to connect said rear end to the end of said tongue extending into said groove in such a manner that said rear segment is pivotable relative to said front segment about said fastening member.

10. The eyewear as claimed in claim 9, wherein, for each of said temples, said tongue is made of metal, said fastening member being a screw, said first through hole and said second through hole being threaded.

11. The eyewear as claimed in claim 9, wherein, for each of said temples, said tongue of said pivot connector is configured to have an s-shape extending in a front-rear direction transverse to the left-right direction.

12. The eyewear as claimed in claim 8, wherein, for each of said temples, said rear end of said front segment is formed with a first groove indented from a lower end of said rear end, and a first through hole extending through said rear end in a left-right direction and in spatial communication with said first groove, said front end of said rear segment being formed with a second groove open toward said rear end of said front segment, said pivot connector including a movable member, a biasing member, a rod and a fastening member, said movable member including an elongated housing disposed movably in said second groove and having front and rear end walls, and a pivot connecting segment extending from said elongated housing outwardly of said second groove into said first groove, formed with a second through hole aligned with said first through hole in the left-right direction, said rod extending movably through said rear end wall of said elongated housing and having a head portion that is disposed in said elongated housing and that has a diameter greater than that of said biasing member, and a fixed portion that extends outwardly of said elongated housing away from said front end and that is fixed in said second groove, said biasing member being disposed in said elongated housing, sleeved on said rod, having opposite ends that respectively abut against said head portion and said rear end wall of said elongated housing, and biasing said movable member toward said fixed portion, said fastening member of said pivot connector extending through said second through hole and said first through hole in the left-right direction so as to connect said pivot connecting segment to said rear end in such a manner that said rear segment is pivotable relative to said first segment about said fastening member.

13. The eyewear as claimed in claim 8, wherein, for each of said temples, said protruding portion has four of said first flat surfaces that are non-coplanar and that define three of said convex corner sections.

14. The eyewear as claimed in claim 8, wherein, for each of said temples, said protruding portion has four of said first flat surfaces that are non-coplanar and that define three of said convex corner sections, said recess portion having three of said second flat surfaces that are non-coplanar and that define two concave corner sections, any two adjacent ones of said second flat surfaces being connected to each other and forming the second obtuse angle therebetween to define one of said concave corner sections, said rear segment being positioned relative to said front segment when said concave corner sections are brought into engagement with any two adjacent ones of said convex corner sections, respectively.

\* \* \* \* \*